United States Patent [19]

Shiraishi et al.

[11] Patent Number: 5,446,816
[45] Date of Patent: Aug. 29, 1995

[54] OPTICAL FIBER HAVING A LENS FORMED AT AN END THEREOF

[75] Inventors: Kazuo Shiraishi, Kitakatsushika; Kazuhito Matsumura, Utsunomiya; Isamu Oishi; Katsuo Ebine, both of Tokyo, all of Japan

[73] Assignee: The Furukawa Electric Co., Ltd., Tokyo, Japan

[21] Appl. No.: 283,959

[22] Filed: Aug. 1, 1994

[30] Foreign Application Priority Data

Aug. 4, 1993 [JP] Japan .................. 5-193632

[51] Int. Cl.$^6$ .................. G02B 6/32
[52] U.S. Cl. .................. 385/33; 385/79
[58] Field of Search .................. 385/33, 34, 35, 61, 385/79, 88, 93, 139

[56] References Cited

U.S. PATENT DOCUMENTS

| 4,147,402 | 4/1979 | Chown | 385/139 |
| 4,290,667 | 9/1981 | Chown | 385/34 |
| 5,093,877 | 3/1992 | Aita et al. | 385/34 |

FOREIGN PATENT DOCUMENTS

| 0233639 | 8/1987 | European Pat. Off. | 385/34 |
| 63-58406 | 3/1988 | Japan | 385/34 |
| 2-210406 | 8/1990 | Japan | 385/33 |
| 4029104 | 1/1992 | Japan | 385/33 |
| 6-201946 | 7/1994 | Japan | |

OTHER PUBLICATIONS

H. M. Presby, et al, Applied Optics (A publication of the Optical Society of America), vol. 29, No. 18, Jun. 29, 1990, pp. 2692–2695.

Primary Examiner—Rodney B. Bovernick
Assistant Examiner—John Ngo
Attorney, Agent, or Firm—Frishauf, Holtz, Goodman, Langer & Chick

[57] ABSTRACT

An optical fiber having a lens formed at an end thereof comprises a fiber body including a core and a cladding, and an incident light guide portion having a uniform refractive index and integrally formed at an end portion of the fiber body, wherein the incident light guide portion has a convex surface, and the core has a distal end located within the incident light guide portion at a position close to a focal point of the incident light guide portion. When the incident light guide portion is arranged in alignment with a light source such that an extremity of the convex surface of the incident light guide portion faces a light-emitting surface of the light source, assuming that an X-Y coordinate system is established wherein the X axis coincides with the optical axis of the fiber body and the Y axis coincides with a radius direction of the fiber body, the relationship expressed by the following equation is fulfilled:

$$k + nL = \sqrt{(k + z)^2 + r^2} + n\sqrt{(L - z)^2 + r^2}$$

where coordinates of the extremity of the convex surface of the incident light guide portion are (0, 0), coordinates of the light-emitting surface of the light source are (−k, 0), coordinates of the distal end of the core are (L, 0), coordinates of an incident point at which light from the light-emitting surface of the light source falls upon the convex surface of the incident light guide portion are (z, r), and the refractive index of the incident light guide portion is n. Accordingly, no phase difference of laser beams occurs when the optical fiber is connected to a semiconductor laser, making it possible to provide a high coupling efficiency optical fiber.

3 Claims, 7 Drawing Sheets

OPTICAL FIBER HAVING A LENS FORMED AT AN END THEREOF

BACKGROUND OF THE INVENTION

1. Field of the Invention

The present invention relates to an optical fiber having a lens formed at an end thereof for introducing light when the optical fiber is connected to a light source, and more particularly, to an optical fiber of this kind which ensures high-efficiency coupling with a light source (usually, a semiconductor laser).

2. Description of the Related Art

A conventional light-emitting module incorporated in an optical communications system comprises a semiconductor laser serving as a light source, and a lens such as a spherical lens, self-focusing lens or aspherical lens interposed between the semiconductor laser and an optical fiber for converging the laser beam onto the core of the optical fiber. Since the light-emitting module is required to provide high coupling efficiency between the semiconductor laser and the optical fiber, the module is assembled with the optical axes of the semiconductor laser, lens, and optical fiber aligned with each other, so as to achieve maximum coupling power.

The alignment of optical axes of the optical coupling system is, however, complicated, and it is almost impossible to integrate a number of modules into a unit by using a semiconductor laser array, because each optical fiber must be aligned with a corresponding semiconductor laser. Thus, it is difficult to reduce the size and cost of the light-emitting module.

Recently, there has been proposed an optical fiber having a lens directly and integrally formed on an end face thereof, i.e., at a portion of the fiber on which light from the light source is incident (this type of optical fiber is hereinafter called "lensed optical fiber"). In the lensed optical fiber, the fiber end itself functions as a lens. Accordingly, when manufacturing light-emitting modules, the number of required component parts can be reduced, because there is no need to use a light-converging lens, and the number of operations associated with the axis alignment can also be reduced, whereby the cost is cut down.

Figure 1:
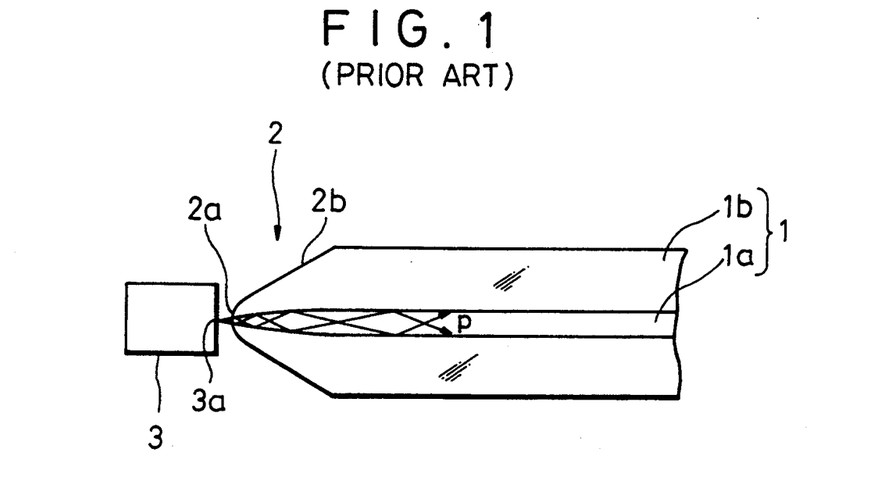
FIG. 1 is a side view showing an example of how a conventional lensed optical fiber is connected to a semiconductor laser.

As shown in FIG. 1, a lensed optical fiber has a lens 2 formed integrally at an end of a fiber body 1 composed of a core 1a and a cladding 1b. Where the optical fiber 1 is a silica glass optical fiber, for example, the lens 2 is formed in the following manner: First, while a portion of the silica glass optical fiber is heated by heating means such as a burner, a tensile force is applied to the fiber in the longitudinal direction thereof, whereby the heated portion extends. When the outer diameter of the heated portion has decreased to a predetermined diameter, the optical fiber is cut at the diameter-reduced portion, and then the cut end is again heated for fusion.

In this heating step, the extreme end 2a of the optical fiber, including the core 1a in the center thereof, becomes spherical in shape due to surface tension, and this spherical end functions as a lens. Thus, the lensed optical fiber 1 has a taper portion 2b extending from the extreme end 2a to an outer peripheral edge which is not affected by heat and having a certain inclination determined by the heating and drawing conditions.

The lensed optical fiber produced in this manner is connected to a semiconductor laser 3, and a laser beam is emitted from a light-emitting surface 3a of the semiconductor laser 3. In this case, the laser beam radiates in conical form. In the laser beam thus emitted, a part incident on the spherical surface 2a at the extremity of the core 1a is propagated through the core 1a, as indicated by arrows p in FIG. 1, and is used for optical communications.

Accordingly, in order to increase the coupling efficiency between the semiconductor laser 3 and the lensed optical fiber, it is necessary that the laser beam emitted from the light-emitting surface 3a of the semiconductor laser 3 be converged and focused on the spherical surface 2a of the core 1a with as high efficiency as possible.

In the lensed optical fiber having the above-described structure, however, the spherical end 2a of the core has a small light convergence area. Therefore, this lensed optical fiber has a problem in that the tolerance or allowable range for axial displacement and angular displacement between the spherical end 2a of the core and the light-emitting surface 3a of the semiconductor laser is extremely limited.

Further, in the case of the lensed optical fiber, the radius of the spherical end 2a of the core should be approximately 5 $\mu$m. Accordingly, to increase the coupling efficiency between the semiconductor laser 3 and the optical fiber, the spherical surface 2a must be formed with increased precision. This work, however, is very complicated, in view of the fact that the outer diameter of an optical fiber is about 100 $\mu$m at most, and a desired lens shape cannot be formed with satisfactory reproducibility.

Furthermore, when connecting the lensed optical fiber to a semiconductor laser, they must be positioned close to each other such that the distance between the distal end of the fiber and the semiconductor laser is about 10 $\mu$m.

Thus, the spherical surface 2a of the core of the lensed optical fiber is positioned as close to the light-emitting surface 3a of the semiconductor laser 3 as possible, as shown in FIG. 1, so that the laser beam may be focused on the spherical surface 2a with high efficiency. During this positioning work, however, the distal end 2a of the lensed optical fiber may collide with the light-emitting surface 3a of the semiconductor laser 3, causing damage to the laser resonance surface or the lens 2, or the laser beam reflected at the spherical surface 2a may enter the semiconductor laser 3, making the emission power of the laser 3 extremely unstable.

Figure 2:
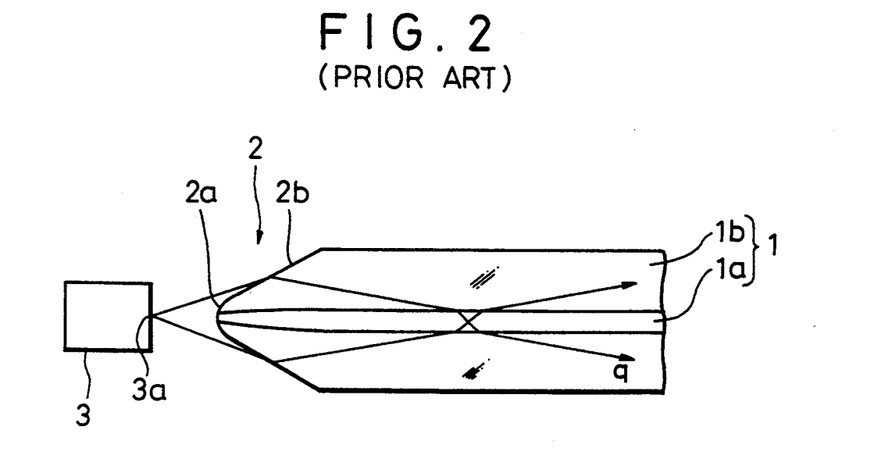
FIG. 2 is a side view showing another example of connection between the conventional lensed optical fiber and the semiconductor laser.

To avoid the drawback, if the distance between the distal end of the lensed optical fiber and the semiconductor laser 3 is increased as shown in FIG. 2, the laser beam from the semiconductor laser 3 diverges at a greater angle. Accordingly, major part of the laser beam falls upon and is refracted at the taper portion 2b, and then propagated through the cladding 1b as indicated by arrows q, thus unduly increasing the coupling loss between the semiconductor laser and the lensed optical fiber.

Figure 3:
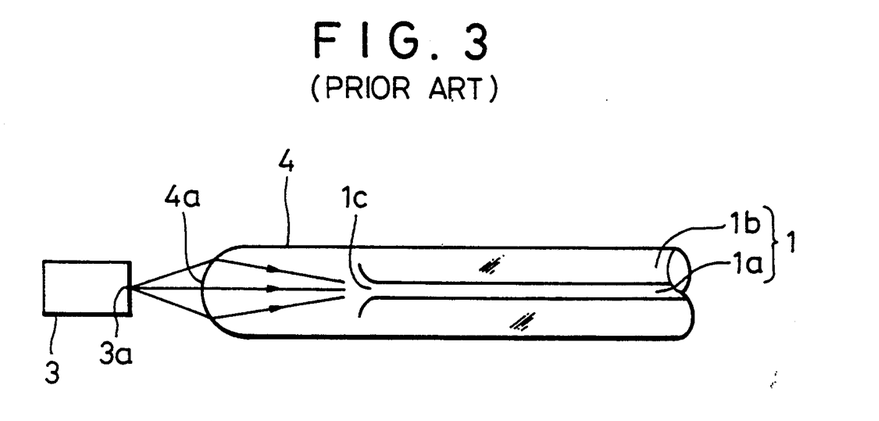
FIG. 3 is a side view of a lensed optical fiber proposed in Japanese Patent Application No. 4-348019.

To solve the above problem associated with the conventional lensed optical fiber, the inventors of the present application developed a lensed optical fiber having the structure shown in FIG. 3 (Japanese Patent Application No. 4-348019), corresponding to Japanese Laid-Open Patent Publication No. 6-201946.

This lensed optical fiber has an incident light guide portion at an end portion 4 thereof. The incident light guide portion 4 extends from an end face 4a of the fiber to a distal end 1c of the core 1a and is made of an optical material having a uniform refractive index.

The end face 4a of the incident light guide portion 4 is formed in the shape of a hemisphere having a radius substantially equal to that of the optical fiber 1 or a convexity such as a paraboloid. Thus, when this optical fiber is connected to the semiconductor laser 3, the laser beam emitted in conical form from the light-emitting surface 3a of the semiconductor laser 3 falls upon the convex surface 4a formed at the end of the fiber, is refracted at the convex surface 4a and propagated through the incident light guide portion 4, such that the laser beam is concentrated on the distal end 1c of the core 1a of the optical fiber 1.

The optical fiber 1 is previously formed such that the distal end 1c of the core 1a is located in the vicinity of the focal point of the convex surface; therefore, the amount of light concentrated on the core 1a of the optical fiber is extremely large, compared with the case of the lensed optical fiber shown in FIG. 1.

Namely, this lensed optical fiber permits high coupling efficiency with respect to the semiconductor laser, and the distance between the end face 4a of the fiber and the light-emitting surface 3a of the semiconductor laser 3 can be increased. Accordingly, a number of lensed optical fibers of this type can be integrated into a unit by using a semiconductor laser array.

However, since the end face 4a of the incident light guide portion 4 of the above lensed optical fiber is formed in the shape of a convexity such as a hemisphere, the laser beam reaching the distal end 1c of the core 1a is subject to aberration.

A conventional measure to eliminate the aberration is to form the end of an optical fiber into an aspherical shape such as a hyperboloid, by using a $CO_2$ laser (cf. H. M. Presby, et al., Appl. Opt., 2692 (1991)).

However, when the optical fiber having an end face processed by this method is connected to a semiconductor laser, the distance between the end face of the fiber and the light-emitting surface of the semiconductor laser must be very short, and thus it cannot be said that this optical fiber is suited for practical use.

OBJECTS AND SUMMARY OF THE INVENTION

One object of the present invention is to provide an optical fiber having a lens formed at an end thereof to be connected to a semiconductor laser which fiber ensures high coupling efficiency even if positioned at a large distance from the light-emitting surface of the semiconductor laser.

Another object of the present invention is to provide an optical fiber which has an aspherical lens formed at an end thereof and in which a laser beam reaching a fiber core after passing through the aspherical lens is subject to no aberration.

Still another object of the present invention is to provide an optical fiber having a lens formed at an end thereof, which can be suitably integrated using a semiconductor laser array and can provide an inexpensive light-emitting module having a small overall size.

To achieve the above objects, the present invention provides an optical fiber having a lens formed at an end thereof, comprising:
a fiber body including a core and a cladding; and
an incident light guide portion having a uniform refractive index and integrally formed at an end portion of the fiber body, an outer surface of the incident light guide portion being party convex-shaped, the core having a distal end located within the incident light guide portion at a position close to a focal point of the incident light guide portion, the incident light guide portion having dimensional properties defined as follows:

when the incident light guide portion is arranged in alignment with a light source such that an extremity of the convex surface of the incident light guide portion faces a light-emitting surface of the light source, assuming that an X-Y coordinate system is established wherein an X axis coincides with an optical axis of the fiber body and a Y axis coincides with a radius direction of the fiber body, a relationship expressed by the following equation is fulfilled:

$$k + nL = \sqrt{(k + z)^2 + r^2} + n\sqrt{(L - z)^2 + r^2}$$

where coordinates of the extremity of the convex surface of the incident light guide portion are (0, 0), coordinates of the light-emitting surface of the light source are (−k, 0), coordinates of the distal end of the core are (L, 0), coordinates of an incident point at which light from the light-emitting surface of the light source falls upon the convex surface of the incident light guide portion are (z, r), and the refractive index of the incident light guide portion is n.

DETAILED DESCRIPTION OF THE PREFERRED EMBODIMENTS

Figure 4:
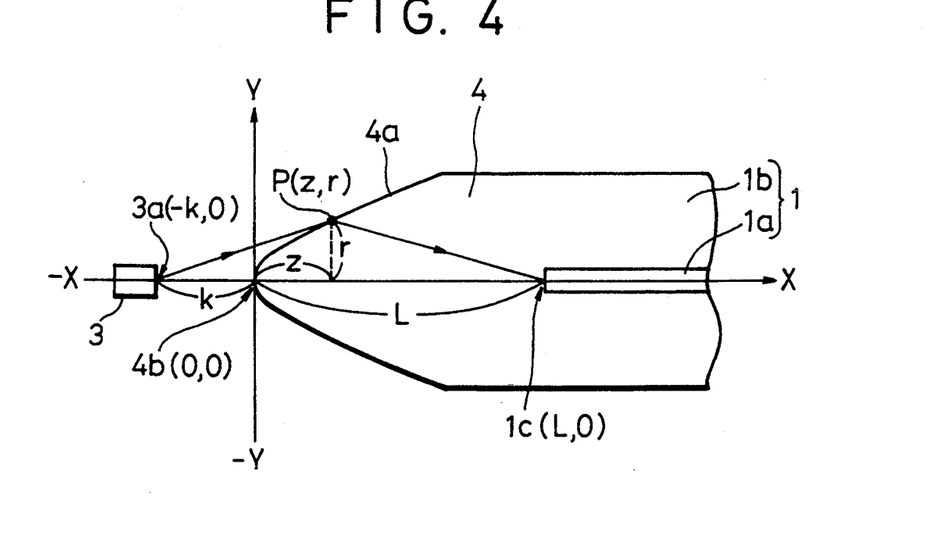
FIG. 4 is a side view illustrating how a lensed optical fiber according to the present invention is positioned relative to a semiconductor laser.

As shown in FIG. 4, in an optical fiber 1 having a lens formed at an end thereof (hereinafter referred to as "lensed optical fiber"), an incident light guide portion 4 having a uniform refractive index n is integrally formed at an end portion of the optical fiber 1. The incident light guide portion 4 has an aspherical convex surface 4a, and a distal end 1c of a fiber core 1a is located at a position close to the focal point of the incident light guide portion 4. The distal end 1c of the core 1a is positioned at a distance L from an extreme end (extremity) 4b of the incident light guide portion 4.

It is here assumed that the lensed optical fiber 1 is arranged coaxially with a semiconductor laser 3 so as to provide a gap k between the extreme end 4b of the incident light guide portion 4 and a light-emitting surface 3a of the semiconductor laser 3, and that a laser beam emitted from the light-emitting surface 3a falls upon an arbitrary point P on the convex surface 4a, then is propagated through the incident light guide portion 4 and focused on the distal end 1c of the fiber core 1a.

With the semiconductor laser 3 and the lensed optical fiber 1 positioned as shown in FIG. 4, an X-Y coordinate system is assumed wherein the X axis coincides with an optical axis passing through the light-emitting surface 3a of the semiconductor laser 3, the extreme end 4b of the incident light guide portion 4, and the distal end 1c of the core 1a of the optical fiber 1, the Y axis extends in a radius direction of the lensed optical fiber 1, and the origin (0, 0) coincides with the extreme end 4b of the incident light guide portion 4. In this case, the position of the light-emitting surface 3a of the semiconductor laser 3 is represented by coordinates ($-k$, 0), and the position of the distal end 1c of the fiber core 1a is represented by coordinates (L, 0).

Provided the coordinates of the point P at which the laser beam is incident on the convex surface 4a are (z, r), conditions will be now considered under which no phase difference occurs between a laser beam propagated along an optical path (1), which passes through the light-emitting surface 3a, the extreme end 4b, the incident light guide portion 4 and the distal end 1c of the core 1a, and a laser beam propagated along an optical path (2), which passes through the light-emitting surface 3a, the incident point P, the incident light guide portion 4 and the distal end 1c of the core 1a.

First, the phase (optical distance) of the laser beam propagated along the optical path (1) is given by $k+nL$. The phase (optical distance) of the laser beam propagated along the optical path (2) is given by $$\sqrt{(k+z)^2 + r^2} + n\sqrt{(L-z)^2 + r^2}$$

Therefore, in order that no phase difference may occur between the laser beams propagated along the optical paths (1) and (2), respectively, the laser beams should be in phase, and thus the following equation need be fulfilled:

$$k + nL = \sqrt{(k+z)^2 + r^2} + n\sqrt{(L-z)^2 + r^2} \quad (1)$$

Namely, with the semiconductor laser 3 and the lensed optical fiber 1 positioned as shown in FIG. 4, if the convex surface 4a of the incident light guide portion 4 is formed such that z and r have values satisfying the above equation (1), then no phase difference occurs between the laser beams converging to the distal end 1c of the fiber core 1a.

In the lensed optical fiber according to the present invention, the incident light guide portion 4 is integrally formed at an end portion of the optical fiber 1 and has a convex surface 4a satisfying equation (1) above.

The convex surface 4a of the incident light guide portion 4 may have a shape satisfying an approximate expression of equation (1), as explained below.

Specifically, the approximate expression can be derived as follows: First, a part in the right side of equation (1), i.e., $\sqrt{(L-z)^2 + r^2}$ is expanded and approximated as follows:

$$\sqrt{(L-z)^2 + r^2} = (L-z)\sqrt{1 + \{r/(L-z)\}^2} \quad (2)$$
$$\approx L - z + (1/2) \cdot \{r^2/(L-z)\}$$

Substituting formula (2) into equation (1) provides the following equation:

$$(k + nz) - \frac{n}{2} \cdot \frac{r^2}{L-z} = \sqrt{(k+z)^2 + r^2} \quad (3)$$

Subsequently, both sides of equation (3) are squared. In this case, L can be deemed to be infinitely great, and the second term in the left side of the resulting formula is very small and thus is negligible, then $$r = \left( \frac{(n-1)(L-z)z\{2k + (n+1)z\}}{L + nk + (n^2-1)z} \right)^{\frac{1}{2}} \quad (4)$$

Accordingly, if the convex surface 4a of the incident light guide portion 4 is formed so as to satisfy the above equation (4), then substantially no phase difference of laser beams occurs at the distal end 1c of the core 1a of the lensed optical fiber 1.

In connection with equation (4), where $L \to \infty$, that is, in the case where the laser beam from the semiconductor laser 3 is propagated through the incident light guide portion 4 in the form of parallel rays, equation (4) can be modified as $$r = \sqrt{(n-1)z\{2k + (n+1)z\}} \quad (4)'$$

In this case, the convex surface 4a of the incident light guide portion 4 should be hyperboloidal.

The lensed optical fiber according to the present invention can be produced in the following manner:

First, an end portion of the optical fiber 1 is cut in a direction perpendicular to the axis thereof. Then, a portion of the optical fiber including the cut end is locally heated by means of arc discharge, micro torch, or the like.

Consequently, the cut end of the optical fiber is melted, and a spherical convex portion having a radius substantially equal to that of the optical fiber 1 is formed on the cut end face due to surface tension. In the locally heated portion of the optical fiber, the dopant in the core 1a diffuses into the cladding 1b due to heat, and thus the boundary between the core 1a and the cladding 1b vanishes. As a result, the end portion of the optical fiber 1 up to the distal end 1c of the fiber core 1a changes in its entirety to homogeneous glass and functions as the incident light guide portion 4 with the uniform refractive index n. In this case, by controlling the local heating conditions, the distal end 1c of the core 1a of the optical fiber 1 can be positioned in the vicinity of the focal point of the incident light guide portion 4.

At this stage, the convex surface 4a of the incident light guide portion 4 is spherical and does not have a shape satisfying the aforementioned equation (1) or (4).

Figure 5:
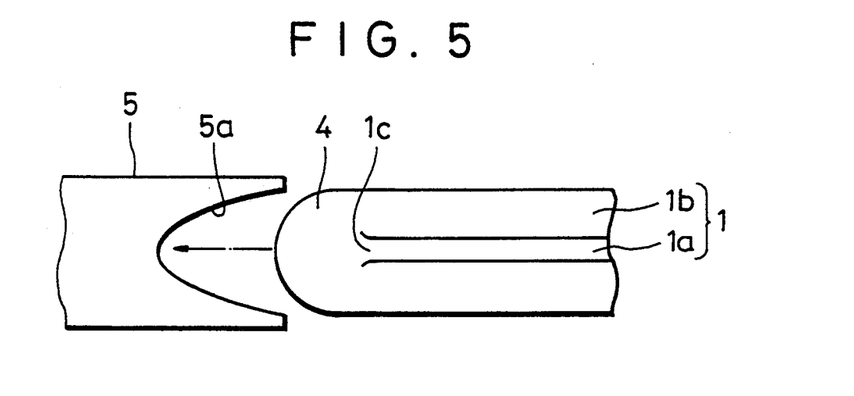
FIG. 5 is a schematic view illustrating a method of producing the lensed optical fiber of the present invention.

Therefore, a die 5 having a concave die face 5a satisfying equation (1) or (4) is used, as shown in FIG. 5. Specifically, while the optical fiber 1 is heated, the spherical end of the incident light guide portion 4 is pressed against the die face 5a, thereby forming the spherical end into an aspherical shape satisfying equation (1) or (4).

According to this method, the incident light guide portion 4 is directly formed on an end face of the optical fiber 1. In practice, however, this method requires considerable skill.

The incident light guide portion 4 may, therefore, be produced by the method described below.

Figure 6:
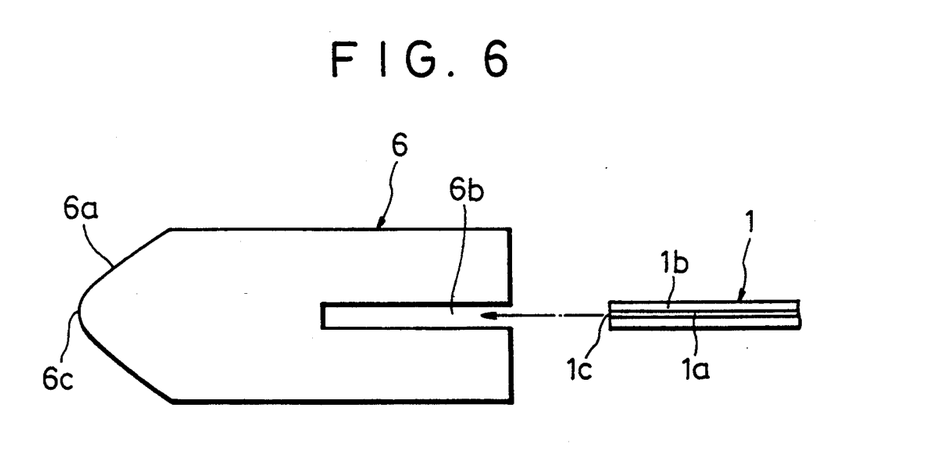
FIG. 6 is a schematic view illustrating another method of producing the lensed optical fiber of the present invention.

As shown in FIG. 6, a transparent sleeve 6 made of transparent glass or transparent plastic material having a desired refractive index is prepared which sleeve has a convex surface 6a satisfying equation (1) or (4) and which also has a small-diameter hole 6b cut in a rear end thereof for allowing insertion of the optical fiber 1. An optical fiber 1 whose core 1a is exposed at an end face thereof is inserted into the small-diameter hole 6b, and then securely bonded to the sleeve 6 to form a one-piece body.

This method is preferable to the first-mentioned method in which the incident light guide portion with a desired shape is directly formed on an end face of the optical fiber, because the transparent sleeve 6 is separate from the optical fiber and thus can be easily formed into a desired shape.

Further, the transparent sleeve 6 can be mass-produced since a molding method using various materials such as multicomponent glass is available. Furthermore, if the transparent sleeve is formed so as to have a diameter of about 1 mm and a plurality of such transparent sleeves are set in array, then a semiconductor laser array can be used as light sources. This means that the lensed optical fibers and related components can be integrated into a light-emitting module.

Embodiment 1

In the same type of lensed optical fiber as shown in FIG. 4, the extreme end 4b of the incident light guide portion 4 having a refractive index n of 1.45 was set apart from the light-emitting surface 3a of the semiconductor laser 3 at a distance k of 30 μm.

With the distance L between the extreme end 4b and the distal end 1c of the core 1a changed to different values, coordinates (z, r) satisfying equation (1) were calculated, and based on the calculated values, profiles of the convex surface 4a of the incident light guide portion 4 were obtained.

Figure 7:
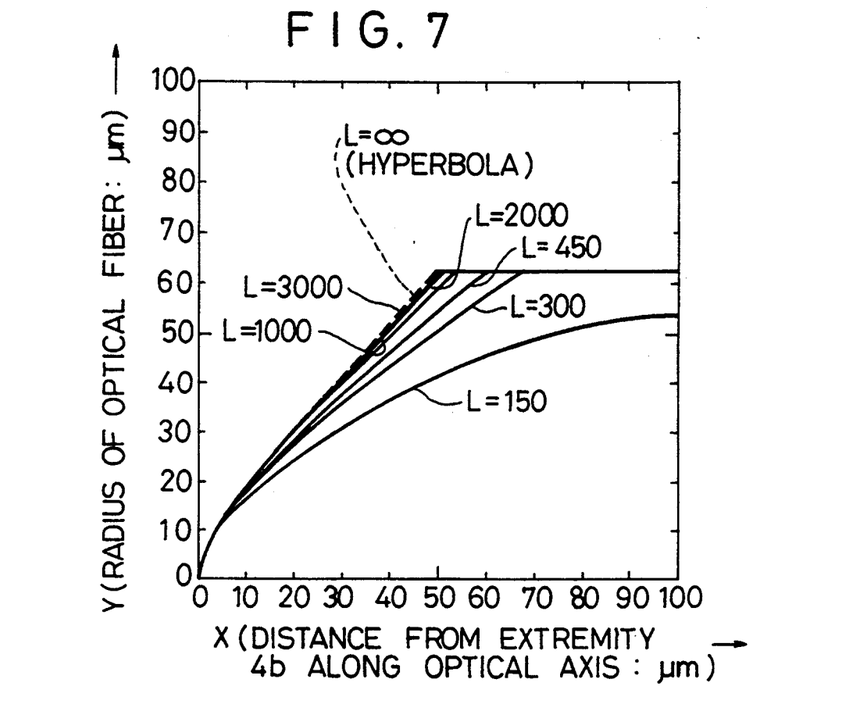
FIG. 7 is a side view showing examples of a convex surface of an incident light guide portion of the lensed optical fiber according to the present invention.

The results are shown in FIG. 7 which corresponds to the first quadrant of the X-Y coordinate system shown in FIG. 4.

The calculation was performed on the assumption that the radius of the beam spot on the light-emitting surface 3a of the semiconductor laser 3 was 1 μm and that the radius of the core 1a was 5 μm.

In this embodiment in which k was set to 30 μm while L was changed to different values as mentioned above, it was confirmed that none of the profiles of the convex surface 4a of the incident light guide portion 4, shown in FIG. 7, caused a phase difference at the distal end 1c of the core 1a.

Embodiment 2

Profiles of the convex surface 4a satisfying equation (1) were obtained in the same manner as in Embodiment 1, except that the distance k between the extreme end 4b and the light-emitting surface 3a of the semiconductor laser 3 was set to 50 μm.

Figure 8:
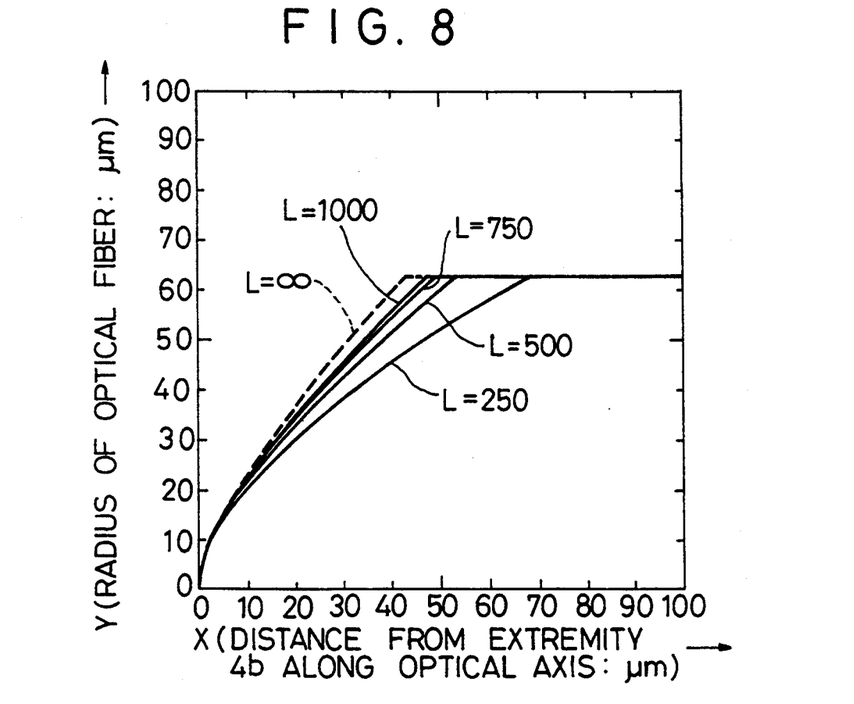
FIG. 8 is a side view showing another set of examples of the convex surface formed on the incident light guide portion of the lensed optical fiber according to the present invention.

The results are shown in FIG. 8, in the same manner as in Embodiment 1.

Embodiment 3

Profiles of the convex surface 4a satisfying equation (1) were obtained in the same manner as in Embodiment 1, except that the distance k between the extreme end 4b and the light-emitting surface 3a of the semiconductor laser 3 was set to 70 μm.

Figure 9:
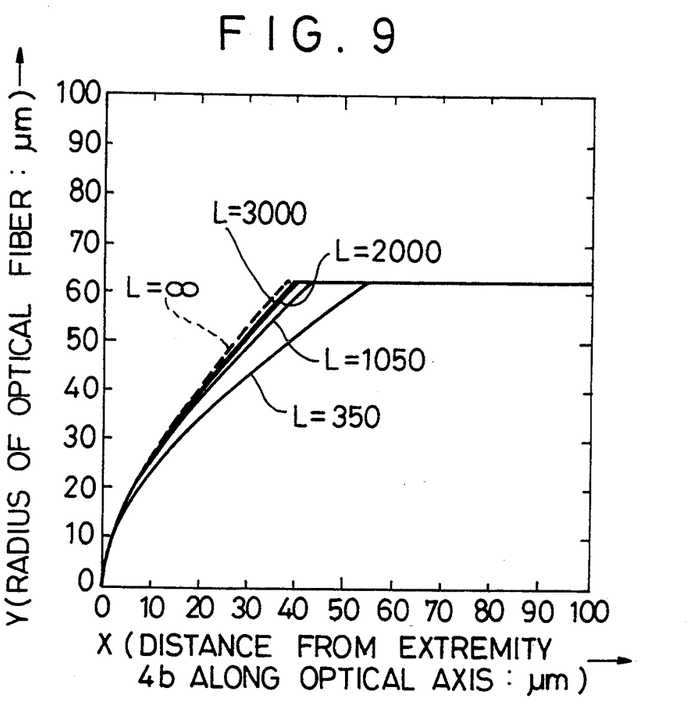
FIG. 9 is a side view showing still another set of examples of the convex surface formed on the incident light guide portion of the lensed optical fiber according to the present invention.

The results are shown in FIG. 9, in the same manner as in Embodiment 1.

Embodiment 4

Profiles of the convex surface 4a satisfying equation (1) were obtained in the same manner as in Embodiment 1, except that the distance k between the extreme end 4b and the light-emitting surface 3a of the semiconductor laser 3 was set to 100 μm.

Figure 10:
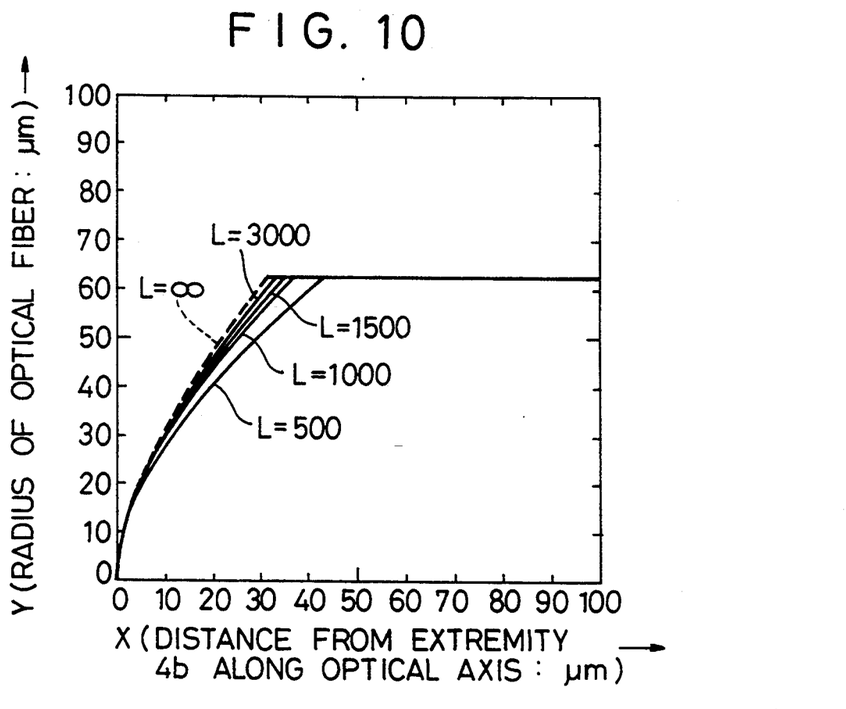
FIG. 10 is a side view showing a further set of examples of the convex surface formed on the incident light guide portion of the lensed optical fiber according to the present invention.

The results are shown in FIG. 10, in the same manner as in Embodiment 1.

Embodiment 5

Using the same lensed optical fiber as used in Embodiment 1, k was set to 50 μm, and with L changed to different values, profiles of the convex surface 4a were calculated according equation (4). The results are indicated by the solid lines in FIG. 11. For comparison, the profile of the convex surface calculated with respect to the distance L of 250 μm according to equation (1) is also shown in FIG. 11 by the dashed line.

Figure 11:
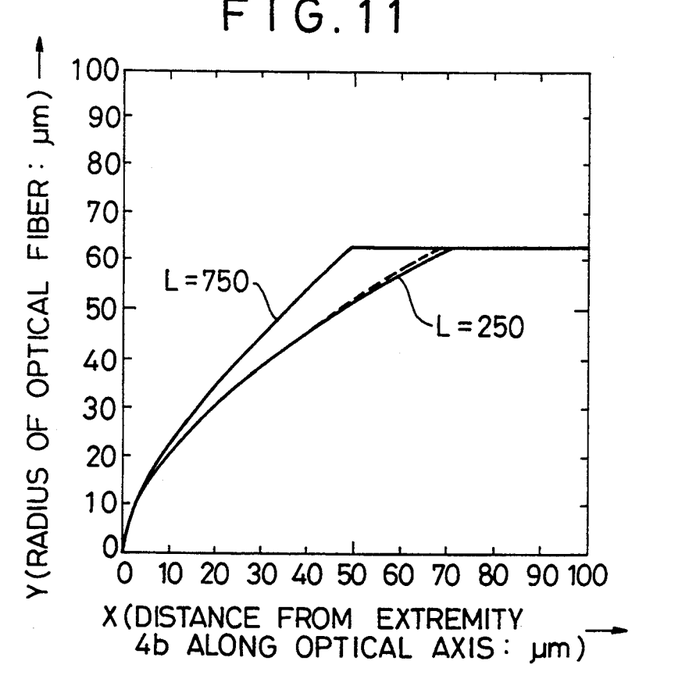
FIG. 11 is a side view showing examples of the convex surface of the incident light guide portion of the lensed optical fiber according to the present invention.

As is obvious from FIG. 11, in the case where the distance L is 250 μm, the profile of the convex surface calculated according to equation (4) is closely approximate to the profile calculated according to equation (1). Namely, the lensed optical fiber having a profile satisfying equation (4) also is suited for practical use, since no phase difference is caused.

Embodiment 6

Using transparent glass having a refractive index of 1.8, a transparent sleeve 6 as shown in FIG. 6 was produced, and an optical fiber 1 whose core 1c was exposed at an end face thereof was inserted into a small-diameter hole 6b cut in the sleeve 6 and fixed by a binding agent.

Figure 12:
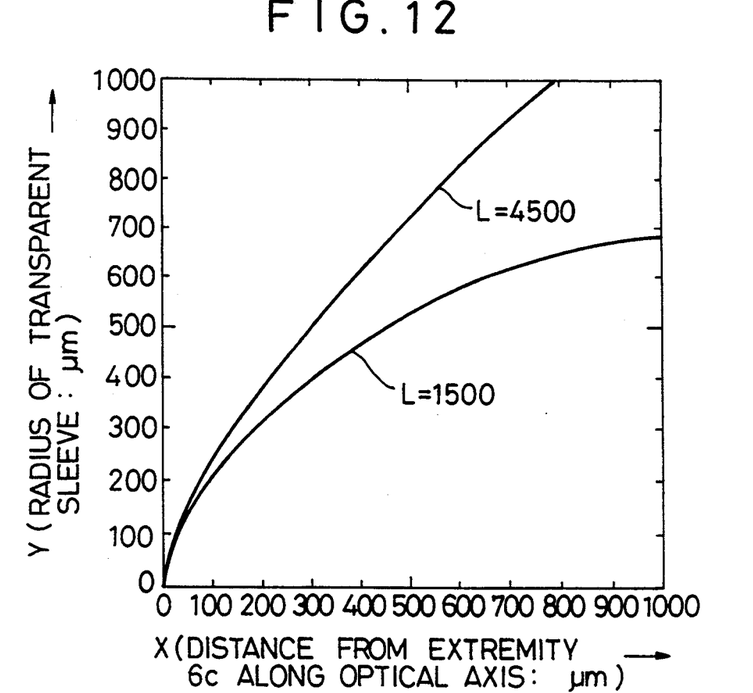
FIG. 12 is a side view showing examples of a convex surface of a transparent sleeve used in the lensed optical fiber of the present invention.

The distance k between the extreme end (extremity) 6c of the transparent sleeve 6 and the light-emitting surface of the semiconductor laser was set to 300 μm, and with the distance L between the extreme end 6c and the distal end 1c of the core of the inserted fiber 1 changed to different values, profiles of the convex surface 6a were calculated according to equation (1). FIG. 12 shows the results.

Also in this case, it was confirmed that, if the convex surface 6a had an aspherical profile as in Embodiments 1 to 5, no phase difference was caused at the distal end 1c of the core 1a, as seen from FIG. 12.

Embodiment 7

Figure 13:
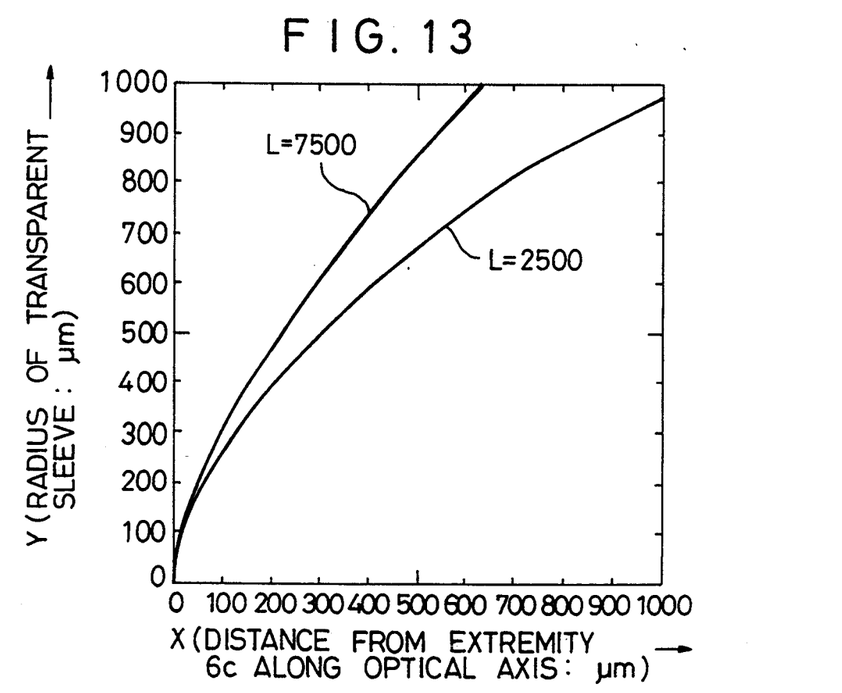
FIG. 13 is a side view showing other examples of the convex surface of the transparent sleeve used in the lensed optical fiber of the present invention.

Profiles of the convex surface 6a satisfying equation (1) were obtained in the same manner as in Embodiment 6, except that the distance k between the extreme end 6c and the light-emitting surface of the semiconductor laser was set to 500 μm. The results are shown in FIG. 13.

Embodiment 8

Figure 14:
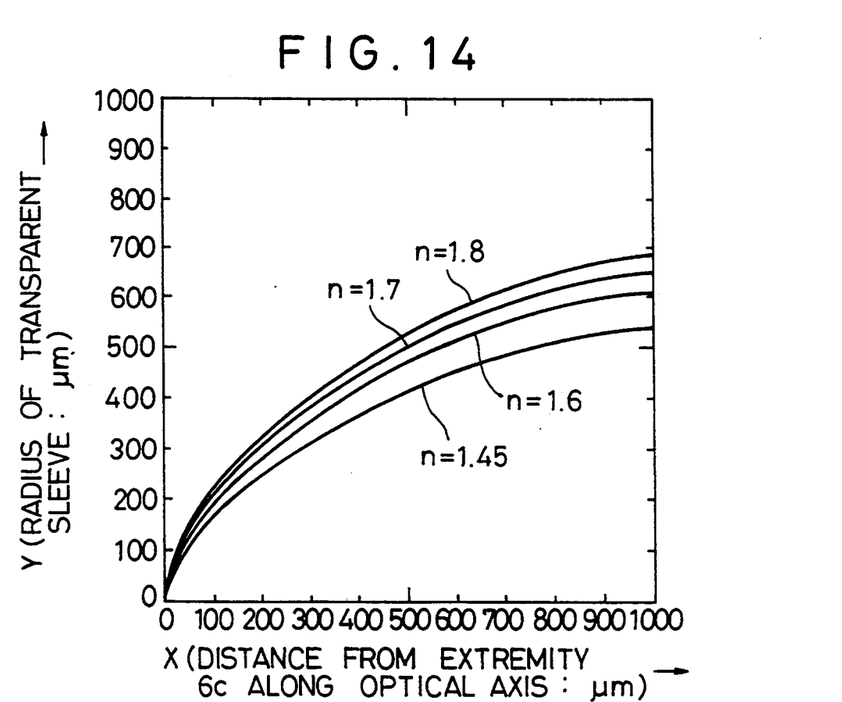
FIG. 14 is a side view showing another set of examples of the convex surface of the transparent sleeve used in the lensed optical fiber of the present invention.

Using transparent sleeves 6 identical to that used in Embodiment 6 but having different refractive indexes n, profiles of the convex surface 6a were derived according to equation (1), with the distances k and L set at 300 μm and 1500 μm, respectively. The results are shown in FIG. 14.

Embodiment 9

Figure 15:
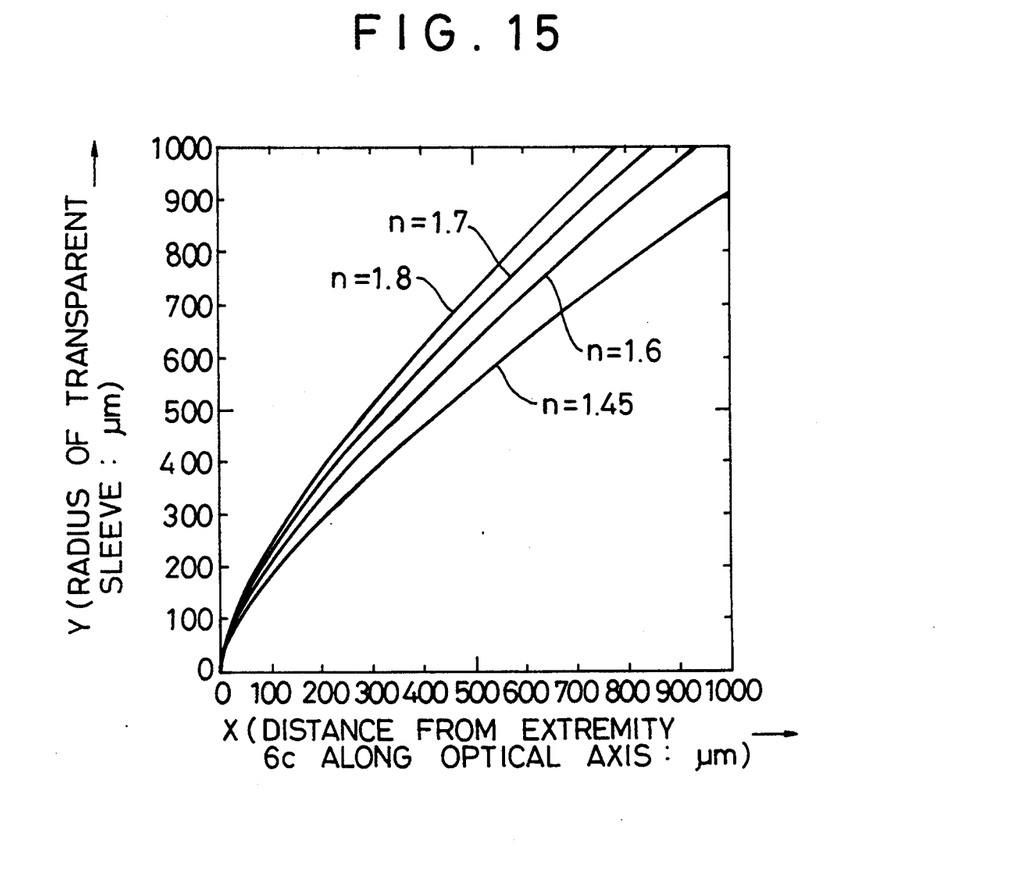
FIG. 15 is a side view showing a further set of examples of the convex surface of the transparent sleeve used in the lensed optical fiber of the present invention.

Using transparent sleeves 6 identical to that used in Embodiment 6 but having different refractive indexes n, profiles of the convex surface 6a were derived according to equation (1), with the distances k and L set at 300 μm and 4500 μm, respectively. The results are shown in FIG. 15.

What is claimed is:

1. An optical fiber having a lens portion formed at an end thereof, the optical fiber comprising:
    a fiber body including a core and a cladding; and
    an incident light guide portion having a uniform refractive index and said incident light guide portion being integrally connected to said fiber body at an end portion of said fiber body, said incident light guide portion having an outer surface forming a lens portion;
    the outer surface of said incident light guide portion forming said lens portion being party convex-shaped,
    the core of said fiber body having a distal end located within said incident light guide portion at a position close to a focal point of said incident light guide portion,
    the convex-shaped outer surface of said incident light guide portion forming said lens portion being non-spherical and having dimensional properties defined as follows:
        when said incident light guide portion is arranged in alignment with a light source such that an extremity of the convex-shaped outer surface of said incident light guide portion faces a light-emitting surface of the light source, assuming that an X-Y coordinate system is established wherein an X axis coincides with an optical axis of said fiber body and a Y axis coincides with a radius direction of said fiber body, a relationship expressed by the following equation is fulfilled:

$$k + nL = \sqrt{(k + z)^2 + r^2} + n\sqrt{(L - z)^2 + r^2}$$

where coordinates of the extremity of the convex-shaped outer surface of said incident light guide portion are (0, 0), coordinates of the light-emitting surface of the light source are (−k, 0), coordinates of the distal end of the core are (L, 0), coordinates of an incident point at which light from the light-emitting surface of the light source falls upon the convex-shaped outer surface of said incident light guide portion are (z, r), and the refractive index of said incident light guide portion is n.

2. The optical fiber according to claim 1, wherein said k, L, z, r and n satisfy a relationship expressed by the following equation:

$$r = \left( \frac{(n - 1)(L - z)z\{2k + (n + 1)z\}}{L + nk + (n^2 - 1)z} \right)^{\frac{1}{2}}$$

3. The optical fiber according to claim 1, wherein:
    said fiber body, before said incident light guide portion is integrally formed at an end portion of the fiber body, has the core thereof exposed at a distal end face of said fiber body; and
    said incident light guide portion comprises a transparent sleeve, the transparent sleeve and said fiber body being integrally joined together with said fiber body inserted in the transparent sleeve from a rear end of the transparent sleeve and the fiber body being thereafter bonded transparent sleeve, such that the core of said fiber body is exposed at the distal end face thereof.

* * * * *